US006876106B2

(12) United States Patent
Miyashita et al.

(10) Patent No.: US 6,876,106 B2
(45) Date of Patent: Apr. 5, 2005

(54) LINEAR MOTOR

(75) Inventors: Masahiro Miyashita, Gunma (JP); Atsushi Horikoshi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/449,605

(22) Filed: Jun. 2, 2003

(65) Prior Publication Data

US 2003/0230940 A1 Dec. 18, 2003

(30) Foreign Application Priority Data

May 31, 2002 (JP) .................................... P.2002-158933

(51) Int. Cl.[7] .............................................. H02K 41/00
(52) U.S. Cl. .............................. 310/12; 12/245; 12/261
(58) Field of Search ........................ 310/12, 261, 245, 310/41

(56) References Cited

U.S. PATENT DOCUMENTS 5,703,420 A * 12/1997 Kamata et al. ............... 310/54
5,910,691 A    6/1999 Wavre
6,107,703 A *  8/2000 Korenaga ..................... 310/12
6,476,524 B1 * 11/2002 Miyamoto et al. ........... 310/12

FOREIGN PATENT DOCUMENTS

JP           02002044932 A  *  2/2002  ......... H02K/41/03

* cited by examiner

Primary Examiner—Darren Schuberg
Assistant Examiner—Iraj A. Mohandesi
(74) Attorney, Agent, or Firm—Sughrue Mion, PLLC

(57) ABSTRACT

A linear motor includes a row of permanent magnets fixed at a position above a stator, and a plurality of magnetic pole members fixed at a position below a movable member. The row of permanent magnets is formed from N poles and S poles alternately arranged at given intervals. The plurality of magnetic pole members extend toward the row of permanent magnets and in a vertical direction and have the same height. The extremities of the magnetic pole members oppose the row of permanent magnets via an air gap. The magnetic pole members are coated with insulators, and a former-wound coil is fitted around the insulator. The part of the magnetic pole member coated with the insulator, except for the extremity thereof, is made thin by the amount corresponding to the thickness of the insulator.

7 Claims, 6 Drawing Sheets

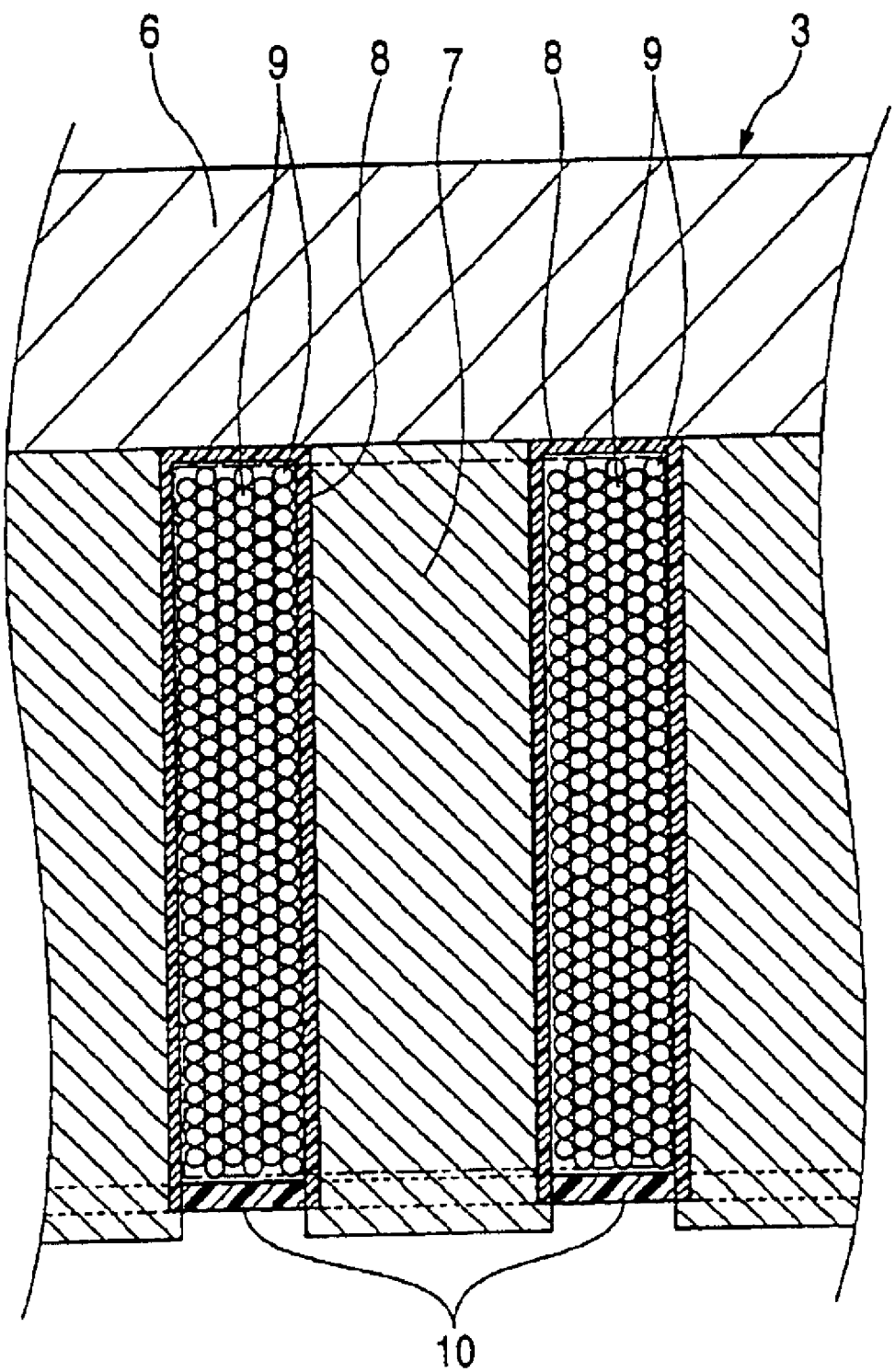

ature.
LINEAR MOTOR

BACKGROUND OF THE INVENTION

1. Field of the Invention

The invention relates to a linear motor, and more particularly, to a linear motor for positioning purpose.

2. Description of the Related Art

A linear motor is used in, e.g., a positioning apparatus, for actuating a table supported by a linear guide provided on a base.

A positioning apparatus shown in FIGS. 5A and 5B comprises a base 100, a induction-type linear motor LM, a pair of linear guides LG, and a table 101. The linear motor LM is fixed at the center of an upper surface of the base 100. The pair of linear guides LG are fixed on top of the base 100 along both sides of the linear motor LM and arranged in parallel with the linear motor LM. The table 101 is fixed on the linear motor LM and the pair of linear guides LG.

The linear motor LM comprises a stator 102 and a movable member 104. The stator 102 includes a fixing member 102a fixed at the center of an upper surface of the base 100 and a permanent magnet 103 fixed on an upper surface of the fixing member 102a. The movable member 104 is provided above the permanent magnet 103 and fixed on a lower surface of the table 101 by means of not-shown bolts (FIG. 5B). The movable member 104 has a plurality of straight magnetic poles provided at given intervals in the direction in which the movable member 104 is to move. Each of the magnetic poles is coated with an insulating material of predetermined thickness. A three-phase coil is wound around the thus-coated magnetic pole. Magnetic flux induced by the three-phase coil is perpendicular to the direction in which the permanent magnets 103 are arranged. An air gap of predetermined dimension is defined between the permanent magnet 103 and the movable member 104.

The linear guides LG comprise a pair of guide rails 105 and sliders 106. The guide rails 105 are fixed on an upper surface of the base 100 and at positions on both sides of the stator 102 and are arranged in parallel with the stator 102. The two sliders 106 are mounted on each guide rail 105. Therefore, a total of four sliders 106 are fixed on a lower surface of the table 101.

When an electric current is caused to flow through the three-phase coils of the movable member 104 of the linear motor LM, relative thrust acts between the movable member 104 and the stator 102 by means of interaction between magnetic flux induced by the plurality of straight magnetic poles of the movable member 104 due to the electric current and magnetic flux induced by the permanent magnet 103. As a result, the movable member 104 is moved along the guide rails 105. The table 101 is then moved while being guided by the guide rails 105. When an electric current is caused to flow through the three-phase coil of the movable member 104 in the opposite direction, drive force acts in opposite direction on the movable member 104, whereupon the movable member 104 is moved in the opposite direction. Thus, the movable member 104 and the table 101 can be moved to a predetermined position by appropriate selection of the direction in which the electric current flows through the three-phase coil of the movable member 104.

In related art, in order to increase the magnetic field induced by the magnetic pole of the movable member 104, the extremity of the magnetic pole is made thick, thereby increasing the area of the magnetic pole (FIG. 6A). In this case, the base portion of the magnetic pole around which the coil is wound becomes narrower, which poses inconvenience in winding a coil directly on the magnetic pole. Further, there is a necessity for winding a coil directly on the magnetic pole, thereby posing difficulty in winding the coil at high density. Further, a structurally inevitable gap arises between the magnetic pole and the coil, wherein the gap is not provided with a coil. For this reason, a limitation is imposed on the intensity of an obtainable magnetic flux.

In order to eliminate this inconvenience, as shown in FIG. 6B, a magnetic pole having the same thickness across its entirety; that is, from its extremity to the base portion (straight magnetic pole) and a former-wound coil fitted around the magnetic pole may be used. The former-wounded coil has been formed into the shape of a coil beforehand, wherein the coil has been wound at high density. In this case, an attempt can be made to minimize the gap between the magnetic pole and the coil, the gap being not provided with a coil. However, the quantity of magnetic flux induced by the magnetic pole is decreased correspondingly.

Further, when a plurality of magnetic poles of the movable member 104 are arranged at given intervals, every other magnetic pole is provided with a coil. The reason for this is that if all magnetic poles are provided with coils, the coils will come in close proximity to each other, thereby posing difficulty in assuring a gap between the adjacent coils.

However, a space for insulator to be used for coating the magnetic pole must be ensured in a related art coil space. For this reason, the extremity of the magnetic pole cannot be made thick correspondingly, thereby resulting; in a decrease in the quantity of magnetic flux induced by the magnetic pole.

Further, when the magnetic poles of the movable member 104 have a straight shape, the magnetic poles and the coils rub against each other when the coils are fitted around the respective magnetic poles, which is likely to cause an earth fault. Thus, the magnetic poles of straight shape are inferior in terms of ease of assembly.

When a plurality of magnetic poles of the movable member 104 are arranged at given intervals, only every other magnetic poles can be provided with a coil. Hence, the space for winding a coil cannot be utilized effectively.

SUMMARY OF THE INVENTION

A first object of the present invention is to provide a linear motor capable of increasing a space for winding a coil without involvement of a decrease in the quantity of magnetic flux.

A second object of the present invention is to provide a linear motor capable of improving ease of assembly.

A third object of the present invention is to provide a linear motor which enables effective utilization of a space for winding a coil defined between magnetic poles.

To achieve the first object, the present invention provides a linear motor comprising:

a magnetic flux generation element for generating magnetic flux;

a magnetic pole member extending toward the magnetic flux generation element;

an insulation material for coating the magnetic pole member; and a coil wound around the insulation material, wherein the magnetic pole member has an extremity opposing the magnetic flux generation element, and a part of the magnetic pole member coated with the insulation material, except for the extremity, is thin by an amount corresponding to the thickness of the insulation material coating around the magnetic pole member.

In the linear motor, the coil may be a former-wound coil which has been formed into the shape of a coil beforehand wherein the coil has been wound at high density. Preferably, the linear motor further comprises a failing prevention member for preventing falling of the coil or the former-wound coil, wherein the falling prevention member is latched at the extremity of the magnetic pole member.

According to the linear motor, a part of each magnetic pole member coated with an insulator, except for the extremity of the magnetic pole member, is thin by an amount corresponding to the thickness of the insulator. Hence, the space to be used for fitting the former-wound coils around the respective magnetic pole members can be increased by an amount corresponding to the thickness of the insulator. Hence, the space to be used for fitting former-wound coils can be increased without involvement of a reduction in the amount of magnetic flux.

In order to achieve the second object, the present invention also provides a linear motor comprising:
 a magnetic flux generation element for generating magnetic flux;
 a magnetic pole member extending toward the magnetic flux generation element; and
 a coil wound around the magnetic pole member,
 wherein the magnetic pole member is tapered toward an extremity thereof opposing the magnetic flux generation element, and an inner peripheral surface of the coil has a shape complementary to the tapered shape of the magnetic pole member.

The linear motor may further comprise: an insulation material for coating the magnetic pole member, wherein a part of the magnetic pole member coated with the insulation material, except for the extremity, is thin by an amount corresponding to the thickness of the insulation material coating around the magnetic pole member.

Further, in the linear motor, the coil may be a former-wound coil which has been formed into the shape of a coil beforehand wherein the coil has been wound at high density. In this case, the linear motor preferably further comprises a falling prevention member for preventing falling of the former-wound coil, wherein the falling prevention member is latched at the extremity of the magnetic pole member.

According to the linear motor, the magnetic pole member has a substantially-truncated tapered pyramid shape, and the inner peripheral section of the former-wound coil has the shape complementary to the substantially-truncated-pyramid shape of the magnetic pole member. The former-wound coil can be clearance-fitted to the magnetic pole member without fail, thereby improving ease of assembly.

In order to achieve the third object, the present invention also provides a linear motor comprising:
 a plurality of magnetic flux generation elements for generating magnetic flux;
 a plurality of magnetic pole members which extend toward the magnetic flux generation elements and are arranged at given intervals along the magnetic flux generation elements; and
 a plurality of coils wound around the respective magnetic pole members,
 wherein one coil is wound around an extremity portion of one of a pair of adjacent magnetic pole members from among the plurality of magnetic pole members, and another coil is wound around a base portion of a remaining magnetic pole member of the pair of adjacent magnetic pole members.

The linear motor may further comprise: insulation materials for coating the respective magnetic pole members, wherein a part of each magnetic pole member coated with the insulation material, except for an extremity, is thin by an amount corresponding to the thickness of the insulation material coating around the magnetic pole member.

Further, in the linear motor, each coil may be a former-wound coil which has been formed into the shape of a coil beforehand wherein the coil has been wound at high density. In this case, the linear motor preferably further comprises a falling prevention member for preventing falling of the former-wound coils, wherein the falling prevention member is latched at the extremity of the magnetic pole members.

According to the linear motor, in relation to a pair of adjacent magnetic pole members from among the plurality of magnetic pole members, one former-wound coil is fitted around the extremity portion of one of the pair of magnetic pole members, and the other former-wound coil is fitted around the base portion of the other magnetic pole member. Hence, the space which exists between the magnetic pole members and is to be used for fitting the coils to the magnetic pole members can be utilized effectively.

Preferably, the plurality of coils constitute a coil of "n" phase ("n" is a natural number); and a set of "n×m" magnetic pole members ("m" is a natural number) corresponding to the coil of "n" phase has a width corresponding to a width to be occupied by (n×m−1) or (n×m+1) magnetic flux generation elements.

According to the linear motor of the invention, the number of magnetic pole members which are provided within a width taken as a basic unit is incremented or decremented by one (i.e., ±1) with respect to the number of permanent magnets provided in a width taken as a basic unit. Hence, occurrence of cogging thrust or a torque ripple can be reduced, thereby achieving a highly-accurate, smooth movement, compared with a case where the number of magnetic pole members which are provided within a width taken as a basic unit is equal to or incremented or decremented by two (i.e., ±2) or more with respect to the number of permanent magnets provided in a width taken as a basic unit.

Preferably, the plurality of coils constitute a coil of "n" phase and a coil of one phase from among the "n" phase corresponds to three consecutive magnetic pole members.

According to the linear motor of the invention, the former-wound coil can be formed from a set of three former-wound coils of one phase. A former-wound coil of a plurality of phases can be readily assembled by alternately winding two types of former-wound coils of one phase, thereby improving ease of assembly. A crossover in each phase can be shortened, and the former-wound coils can be subjected to wire-bonding while being connected together, thereby diminishing the number of former-wound coils to be connected together.

BRIEF DESCRIPTION OF THE DRAWINGS

FIG. 2 is a cross-sectional view of a magnetic pole member in the linear motor of the first embodiment;

DETAILED DESCRIPTION OF THE INVENTION

A linear motor according to a first embodiment of the present invention will be described hereinbelow by reference to the accompanying drawings.

Figure 1A:
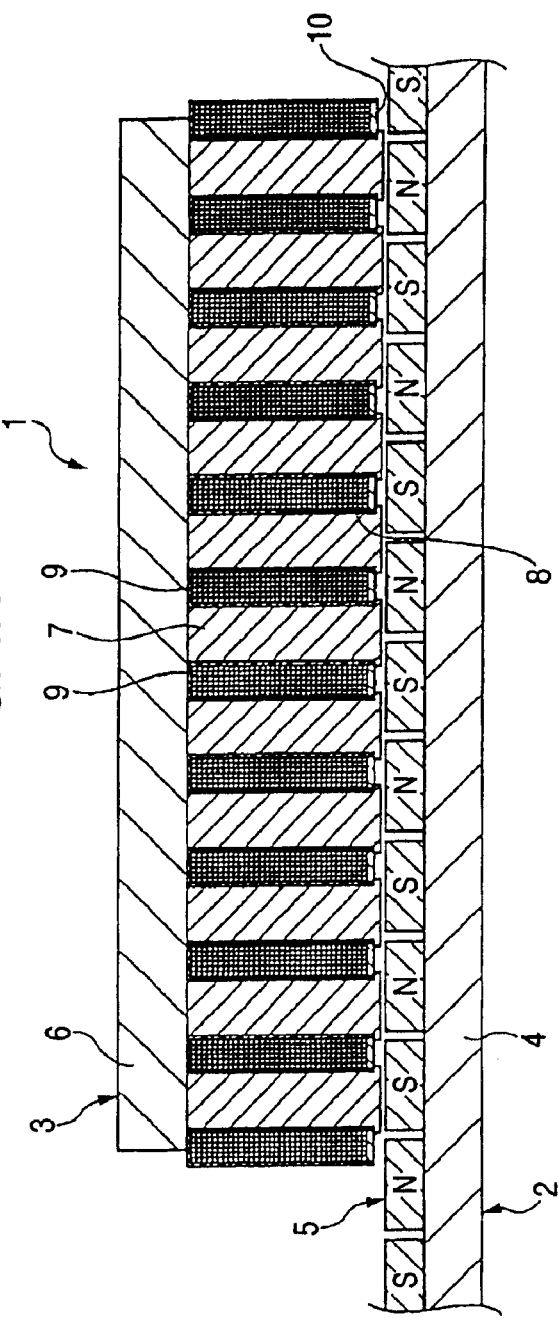
FIG. 1A is a side view (cross-sectional view of a linear motor according to a first embodiment of the present invention.
Figure 1B:
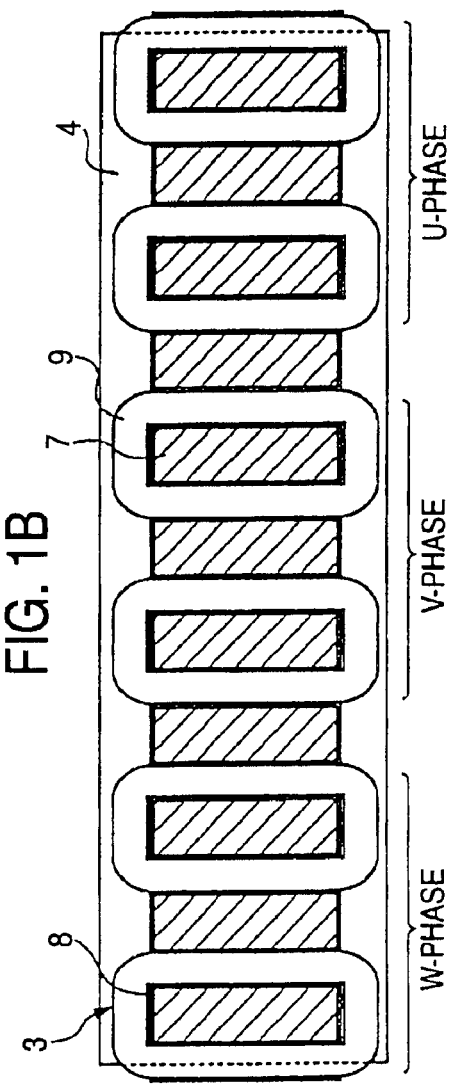
FIG. 1B is a cross-sectional view of a movable member of the linear motor shown in FIG. 1A.

FIG. 1A is a side view (cross-sectional view) of a linear motor according to a first embodiment of the present invention FIG. 1B is a cross-sectional of a movable member for the linear motor shown in FIG. 1A.

Figure 5A:
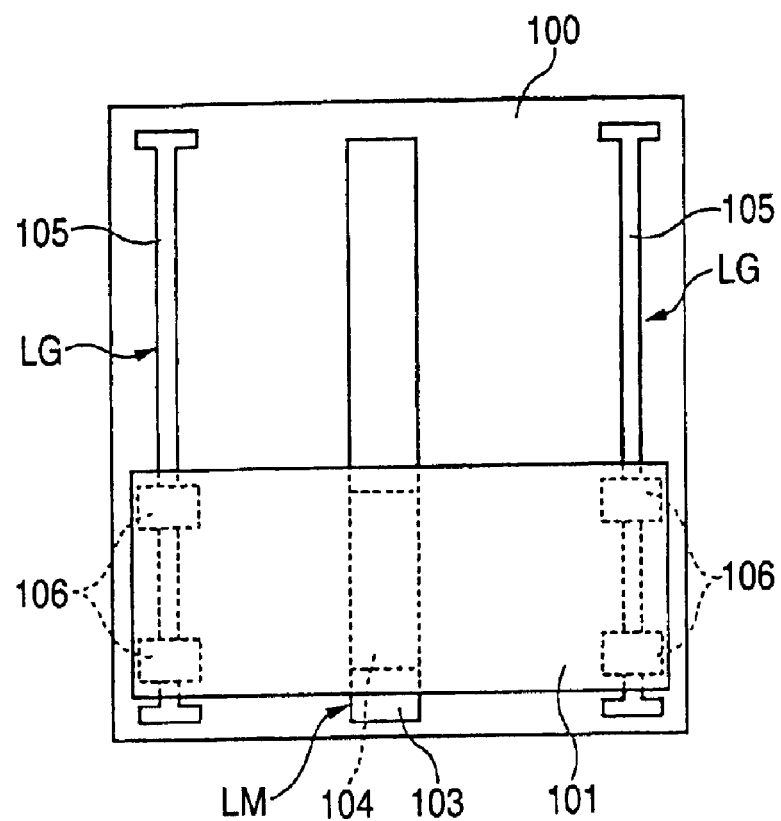
FIG. 5A is a plan view of a positioning apparatus employing a related art linear motor.
Figure 5B:
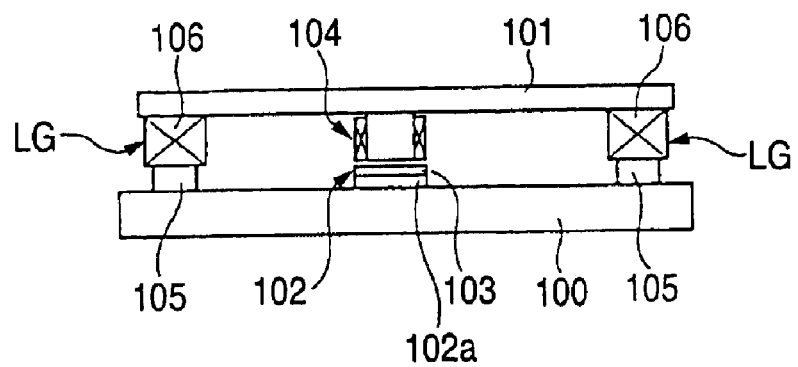
FIG. 5B is a front view of the positioning apparatus shown in FIG. 5A.
Figure 6A:
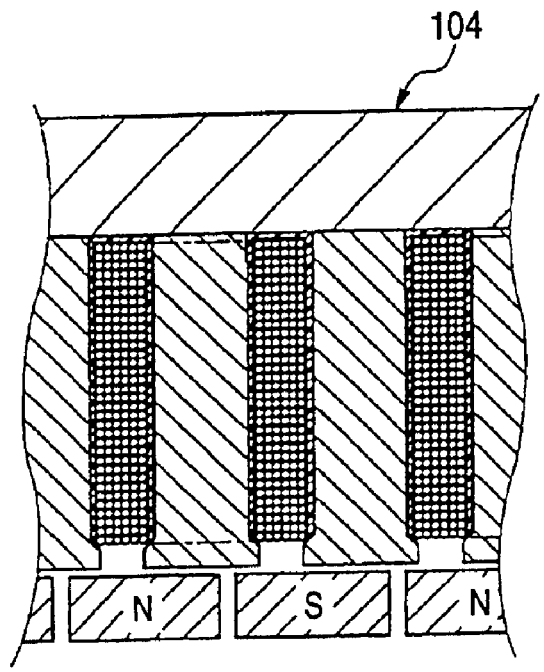
FIG. 6A is a cross-sectional view showing a magnetic pole whose extremity has been made large in the related art linear motor.
Figure 6B:
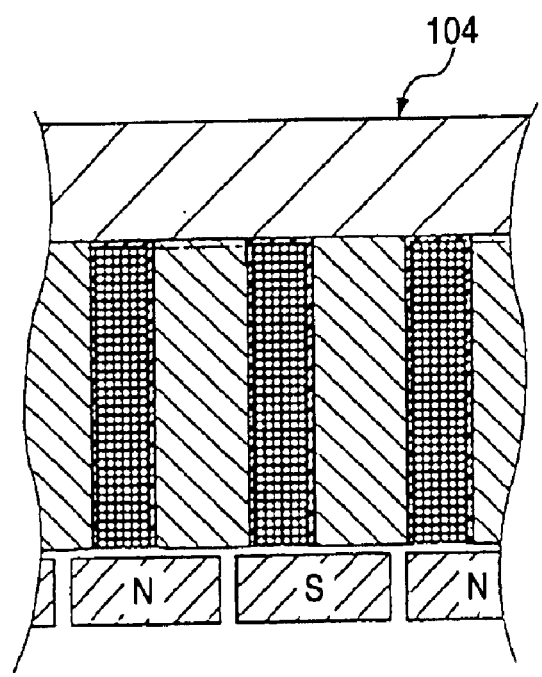
FIG. 6B is a cross-sectional view showing a magnetic pole of straight shape in the related art linear motor.

The linear motor 1 shown in FIG. 1A is used in conjunction with, e.g., the conventional positioning apparatus 1 shown in FIGS. 5A and 5B. The linear motor 1 has a stator 2 fixed on an upper surface of a base 100, and a movable member 3 fixed on a lower surface of a table 101 by means of an appropriate method. The linear motor 1 actuates the table 101 supported by linear guides LG provided on the base 100.

As shown in FIGS. 1A and 1B, the stator 2 includes a fixing member 4 fixed at a center of the upper surface of the base 100 and a row of rectangular-parallelepiped permanent magnets 5 (magnetic flux generation members) fixed on the upper surface of the fixing member 4. The movable member 3 includes a yoke 6 and a plurality of magnetic pole members 7 which are fixed on the lower surface of the yoke 6. The yoke 6 is provided above the row of permanent magnets 5, extends in a direction in which the row of permanent magnets 5 are arranged, and is provided on a lower surface of the table 101 by means of an appropriate method. The row of permanent magnets 5 is arranged such that N poles and S poles are alternately arranged at given intervals in the direction in which the permanent magnets 5 are arranged in FIG. 1A.

The plurality of magnetic pole-members 7 extend straightly in the direction perpendicular to the row of permanent magnets 5 and have the same height. The extremities of the magnetic pole members 7 oppose the row of permanent magnets 5 via an air gap of predetermined dimension. The plurality of magnetic pole members 7 are coated with an insulator 8 of predetermined thickness as shown in FIG. 1B.

FIG. 2 is a cross-sectional view of magnetic pole members provided in the linear motor of the first embodiment.

As shown in FIG. 2, each of the plurality of magnetic pole members 7 is coated with the insulator 8. A part of the magnetic pole member 7 coated with the insulator 8, except for an extremity thereof, is thin by an amount corresponding to the thickness of the insulator 8 coating around the magnetic pole member 7. That is, the thickness of the part of the magnetic pole member 7 coated with the insulator 8 is thin by twice the thickness of the insulator 8, compared with the thickness of the extremity of the magnetic pole member 7. For example, the magnetic pole member 7 to be coated with the insulator 8 is formed thin by an amount of, e.g., 0.3 to 0.4 mm. While the magnetic pole member 7, except for its extremity, is coated with the insulator 8, an outer peripheral surface of the extremity of the magnetic pole member 7 is flush with the outer peripheral surface of the insulator 8.

A so-called former-wound coil 9 which has been formed into the shape of a coil beforehand is fitted around every other magnetic pole members 7. The plurality of former-wound coils 9 constitute a three-phase coil. As a result of an electric current being caused to flow through the former-wound coil 9, the magnetic pole members 7 around which the respective former-wound coils 9 are fitted act as magnetic poles. Further, falling prevention members 10 formed from insulators for preventing falling of the former-wound coils 9 are latched at the respective extremities of the plurality of magnetic pole members 7.

Magnetic flux induced by the former-wound coils 9 is orthogonal to the direction in which the row of permanent magnets 5 are arranged. By means of interaction between the magnetic flux induced by the former-wound coils 9 and another magnetic flux induced by the row of permanent magnets 5, thrust acts between the row of permanent magnets 5 and the former-wound coils 9, whereby the movable member 3 is moved.

According to the first embodiment, the part of each magnetic pole member 7 coated with the insulator 8, except for the extremity of the magnetic pole member 7, is thin by an amount corresponding to the thickness of the insulator 8 coating around the magnetic pole member 7. Hence, the space to be used for fitting the former-wound coils 9 around the respective magnetic pole members 7 can be increased by an amount corresponding to the thickness of the insulator 8. Hence, the space to be used for fitting the former-wound coils 9 can be increased without involvement of a reduction in the amount of magnetic flux.

Figure 3:
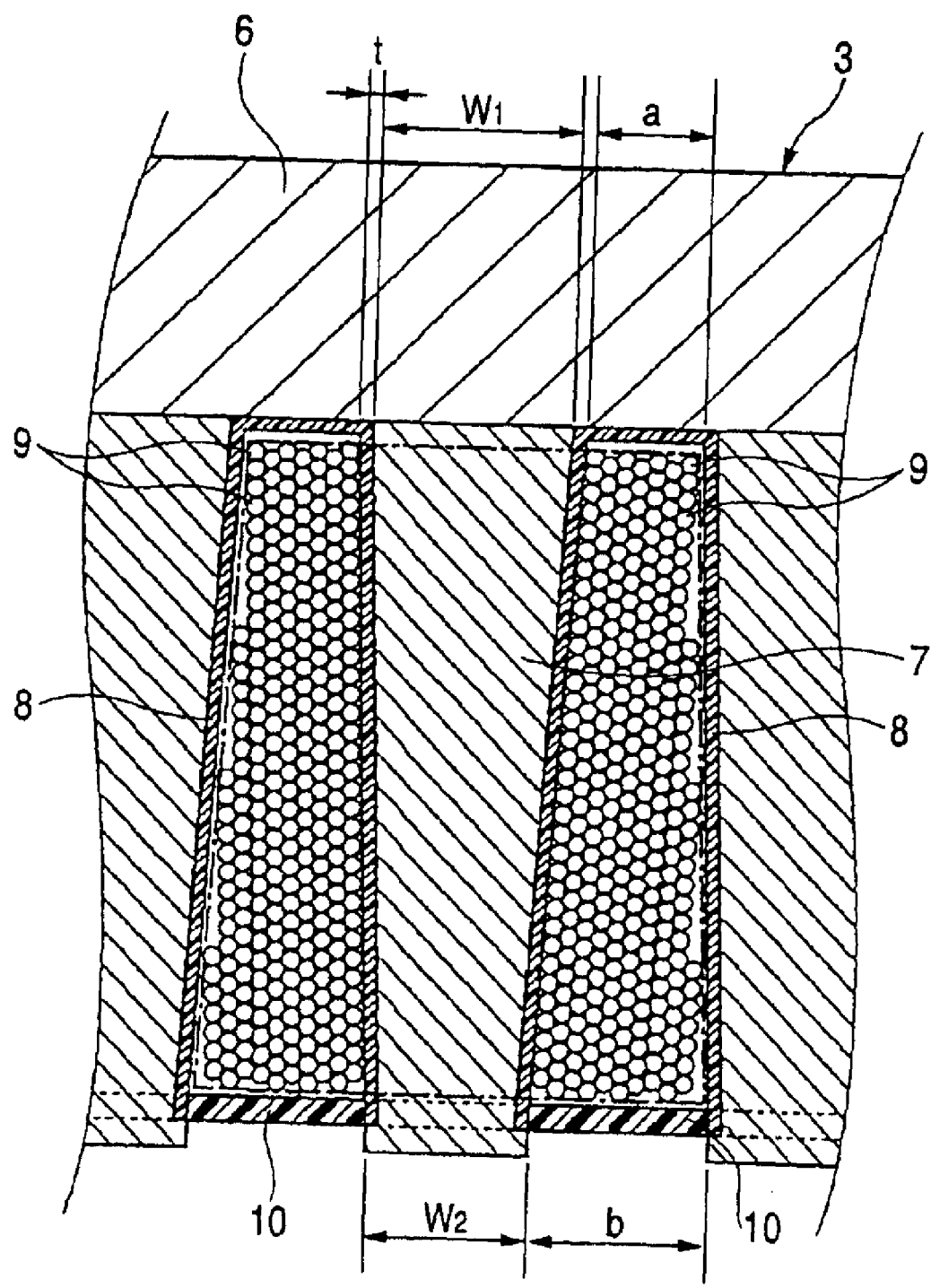
FIG. 3 is a cross-sectional view of a magnetic pole member of a linear motor according to a second embodiment of the invention.

FIG. 3 is a cross-sectional view of a magnetic pole member of a linear motor according to a second embodiment of the present invention.

The linear motor of the second embodiment is basically identical in construction with that of the first embodiment. The linear motor of the second embodiment differs from that of the first embodiment in that the magnetic pole members 7 of the first embodiment have a straight shape whereas the magnetic pole members 7 of the second embodiment have the shape of a substantially-tapered truncated pyramid.

As shown in FIG. 3, the plurality of magnetic pole members 7 have the shape of a substantially-truncated pyramid having a cone angle to be described later; extend toward the row of permanent magnets 5 in the vertical direction; and have the same height. Extremities of the magnetic pole members 7 oppose the row of permanent magnets 5 via an air gap.

The parts of the plurality of magnetic poles 7 to be coated with the insulator 8, except for their extremities, are formed thin by an amount corresponding to the thickness of the insulator 8 coating around the magnetic pole member 7; for example, 0.3 to 0.4 nm. While the magnetic pole member 7, except for its extremity, is coated with the insulator 8, an outer peripheral surface of the extremity of the magnetic pole member 7 is flush with the outer peripheral surface of the insulator 8.

The so-called former-wound coils 9 that have been formed in the form of a coil beforehand are fitted around every other magnetic pole members 7, and the plurality of former-wound coils 9 constitute a three-phase coil. As a result of an electric current being caused to flow through the former-wound coils 9, the magnetic pole members 7 around which the former-wound coils 9 are fitted act as magnetic poles. The inner peripheral section of the former-wound coil 9 has a shape complementary to the substantially-truncated pyramid shape of the magnetic pole member 7. Further, the falling prevention members 10 formed from insulator are latched to the respective extremities of the plurality of magnetic pole members 7 for preventing falling of the former-wound coils 9.

The cone angle of the magnetic pole member 7 is preferably determined so as to satisfy Equation 1 provided below.

$$W_1 + 2t > W_2 \quad (1).$$

Here, $W_1$ denotes the width of a base portion of the magnetic pole member 7 which is to act as a magnetic pole; $W_2$ denotes the width of extremity of the magnetic pole member 7 which is to act as a magnetic pole; and "t" denotes the thickness of the insulator 8. Strictly speaking, the thickness "t" of the insulator 8 depends on the cone angle of the taper. Here, the thickness "t" of the insulator 8 is the value that is maximum and offers the largest allowance, provided that the cone angle is deemed as 90°.

The cone angle of the tapered magnetic pole member 7 is more preferably determined so as to satisfy Equation (2) provided below.

$$(\sqrt{3}) \cdot d \cdot (m-n+1)/2 \geq b-a \geq (\sqrt{3}) \cdot d \cdot (m-n-1)/2 \quad (2)$$

Here, "a" denotes the width of a slot in the base portion including the thickness of the insulator 8; "b" denotes the width of the slot formed at the extremity of the coil; "d" denotes the diameter of the coil; "m" denotes the number of extremities of the coils; and "n" denotes the number of base portions of the coils.

According to the second embodiment, the magnetic pole member 7 has a substantially-truncated tapered pyramid shape, and the inner peripheral section of the former-wound coil 9 has the shape complementary to the substantially-truncated pyramid shape of the magnetic pole member 7. As a result, in addition to the advantage of the first embodiment, the second embodiment also yields an advantage of the former-wound coil 9 being clearance-fitted to the magnetic pole member 7 without fail, thereby improving ease of assembly.

In the second embodiment, the magnetic pole member 7 is formed so as to have a substantially-truncated pyramid tapered toward its extremity. However, the magnetic pole member 7 may be formed so as to be tapered to its extremity. As a result, the former-wound coil 9 is fitted to the magnetic pole member 7, occurrence of a failure, such as earth fault, which would otherwise arise when the coil 9 and the magnetic pole member 7 rub against each other, becomes difficult, thereby improving the ease of assembly to a much further extent.

Figure 4:
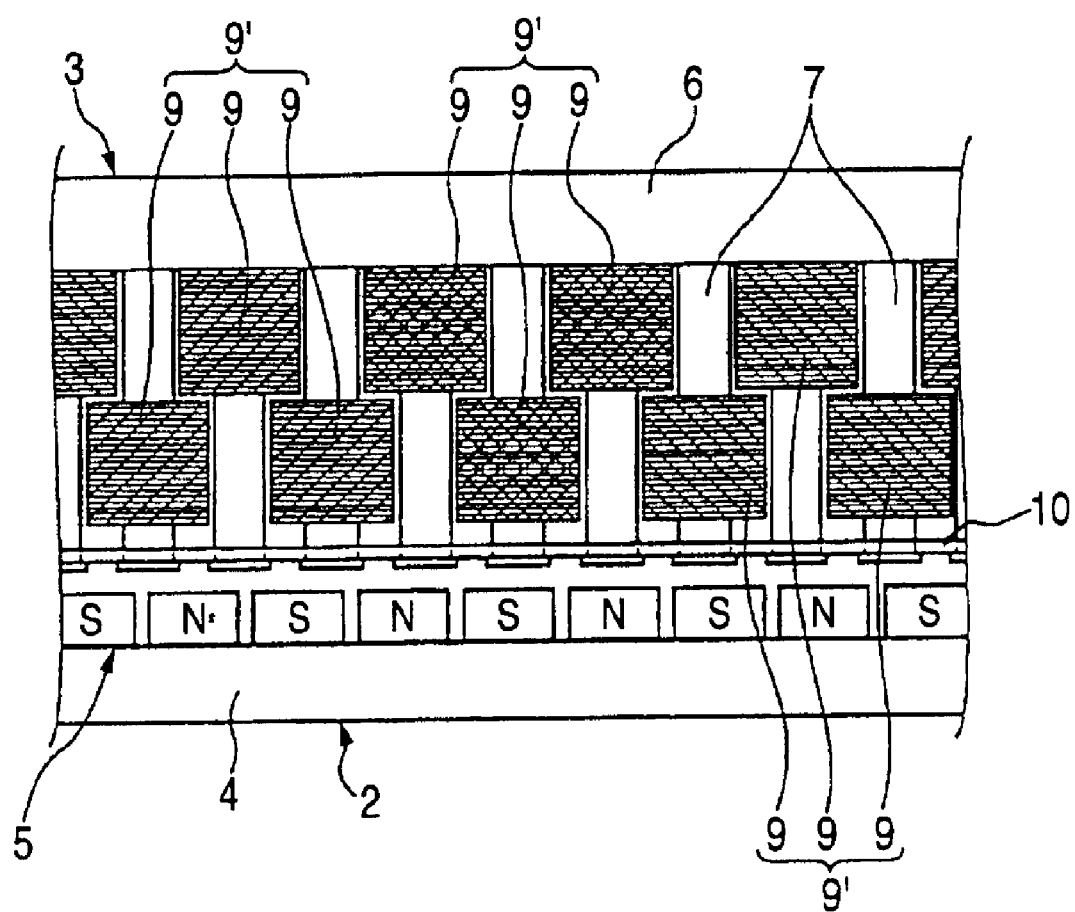
FIG. 4 is a side view of a linear motor 1 according to a third embodiment of the invention.

FIG. 4 is a side view of a linear motor 1 according to a third embodiment of the present invention.

A linear motor LM of the third embodiment is essentially identical in construction with the linear motor of the first embodiment. The third embodiment differs from the first embodiment in that the former-wound coils 9 are fitted around every other magnetic pole member 7 in the first embodiment and that the coils 9 are fitted around the respective magnetic pole members 7 in the present embodiment.

As shown in FIG. 4, the plurality of magnetic pole members 7 respectively extend straight in the direction perpendicular to the row of permanent magnets 5 and have the same height. The extremities of the magnetic pole members 7 oppose the row of permanent magnets 5 via an air gap of predetermined dimension.

The parts of the plurality of magnetic poles 7 to be coated with the insulator 8 (not shown), except for their extremities, are formed thin by an amount corresponding to the thickness of the insulator 8 coating around the magnetic poles 7; for example, 0.3 to 0.4 mm. While the magnetic pole member 7, except for its extremity, is coated with the insulator 8, an outer peripheral surface of the extremity of the magnetic pole member 7 is flush with the outer peripheral surface of the insulator 8.

The so-called former-wound coils 9 that have been formed in the form of a coil beforehand are fitted around respective magnetic pole members 7, and the plurality of former-wound coils 9 constitute a three-phase coil. In relation to a pair of adjacent magnetic pole members 7 from among the plurality of magnetic pole members 7, one former-wound coil 9 is fitted around an extremity portion of one of the pair of magnetic pole members 7, and the other former-wound coil 9 is fitted around a base portion of the other magnetic pole member 7. Since the coils 9 are fitted around the respective magnetic pole members 7, all the magnetic pole members 7 act as magnetic poles as a result of an electric current being caused to flow through the former-wound coils 9. The coils 9 have the height which is one-half that of the magnetic pole member 7. Further, the falling prevention members 10 formed from insulator are latched to the respective extremities of the plurality of magnetic pole members 7 for preventing falling of the former-wound coils 9.

According to the third embodiment, in relation to a pair of adjacent magnetic pole members 7 from among the plurality of magnetic pole members 7, one former-wound coil 9 is fitted around the extremity portion of one of the pair of magnetic pole members 7, and the other former-wound coil 9 is fitted around a base portion of the other magnetic pole member 7. Hence, the space which exists between the magnetic pole members 7 and is to be used for fitting the coils 9 to the magnetic pole members 7 can be utilized effectively.

The plurality of former-wound coils 9 constitute the three-phase coils 9. From among the three-phase coils 9, a former-wound coil 9' of one phase is fitted in correspondence to three adjacent magnetic pole members 7. Further, the coil 9 fitted around the center magnetic pole member 7 is opposite in the direction of winding to the coils 9 fitted around the other two magnetic pole members 7. Namely, the polarity of the center magnetic pole member 7 is opposite that of the other two magnetic pole members 7. Former-wound coils 9 of the other two phases are also formed in the same manner. More specifically, former-wound coils 9 constituting the left former-wound coil 9' in FIG. 4 are, in order from the left, taken as $\overline{V}$, V, and $\overline{V}$. Former-wound coils 9 constituting a center former-wound coil 9' are taken, in order from the left, $\overline{U}$, U, and $\overline{U}$. Further, former-wound coils 9 constituting a right former-wound coil 9' are taken, in order from the left, $\overline{W}$, W, and $\overline{W}$. Here, $\overline{V}$ is opposite in polarity to V. The same also applies to U and W. As a result, the former-wound coil 9 can be formed from a set of three former-wound coils 9' of one phase. A former-wound coil 9 of a plurality of phases can be readily assembled by alternately winding two types of former-wound coils 9 of one phase, thereby improving ease of assembly. A crossover in each phase can be shortened, and the former-wound coils can be subjected to wire-bonding while being connected together, thereby diminishing the number of former-wound coils to be connected together.

In the example illustrated in FIG. 4, three basic units are connected together. However, the invention is not limited to the embodiment, and at least one basic unit may be employed.

In the former-wound coil 9 of three phases, the former-wound coil 9 of each phase comprises three former-wound coils 9'. The three former-wound coils 9' are fitted in correspondence to nine magnetic pole members 7. The entire length of the nine magnetic pole members 7 and the entire length of nine slots are set so as to become equal to a width occupied by a row of 8-pole permanent magnets 5 (8-pole 9 slots). Alternatively, the entire length of the nine magnetic pole members 7 and the entire length of nine slots are set so as to become equal to a width occupied by a row of 10-pole permanent magnets 5 (10-pole 9 slots). More specifically, 8-pole 9 slots or 10-pole 9 slots serve as the basic unit. When a coil of "n" phase is to be formed, (n×m−1) pole: (n×m) slots or (n×m+1) pole (n×m) slots, both being expressed by a general expression, act as a basic unit (where "" and "m" are natural numbers). As a result, the number of magnetic pole members 7 which are provided within a width taken as a basic unit is incremented or decremented by one (i.e., ±1) with respect to the number of permanent magnets provided in a width taken as a basic unit. Hence, occurrence of cogging thrust or a torque ripple can be reduced, thereby achieving a highly-accurate, smooth movement, compared with a case where the number of magnetic pole members which are provided within a width taken as a basic unit is equal to or incremented or decremented by two (i.e., ±2) or more with respect to the number of permanent magnets provided in a width taken as a basic unit.

In the third embodiment, the height of the former-wound coil 9 is set to one-half that of the magnetic pole member 7. However, the only requirement is to cause the magnetic pole member 7 to produce uniform magnetic flux. The height of the former-wound coil 9 may be set to a plurality of equal quarters of the height of the magnetic pole member 7.

In the third embodiment, for instance, U, V, W; U, V, W; and U, V, W may be arranged as basic units.

Needless to say, the first through third embodiments may be implemented-in combination, as required.

In the embodiment, the former-wound coil a serving as a coil is fitted around the magnetic pole member 7. However, the coil may be embodied by winding a manually-wound coil around the magnetic pole members 7. Needless to say, the former-wound coil is superior to the manually-would coil in terms of ease of assembly.

In the embodiment, the row of permanent magnets 5 is fixed on the stator 2, and the magnetic pole members 7 around which the former-wound coils 9 are fitted are fixed on the movable member 3. Instead of such a construction, an electromagnet may be fixed on a stator; and a magnet may be fixed on an electromagnet. Alternatively, an electromagnet may be fixed on a stator; and an electromagnet may be fixed on a movable element.

As has been described in detail, according to a linear motor of the first aspect of the present invention, a part of each magnetic pole member coated with an insulator, except for the extremity of the magnetic pole member, is thin by an amount corresponding to the thickness of the insulator coating the magnetic pole member. Hence, the space to be used for fitting the former-wound coils around the respective magnetic pole members can be increased by an amount corresponding to the thickness of the insulator. Hence, the space to be used for fitting former-wound coils can be increased without involvement of a reduction in the amount of magnetic flux.

According to a linear motor of the second aspect of the present invention, the magnetic pole member has a substantially-truncated tapered pyramid shape, and the inner peripheral section of the former-wound coil has the shape complementary to the substantially-truncated pyramid shape of the magnetic pole member. The former-wound coil can be clearance-fitted to the magnetic pole member without fail, thereby improving ease of assembly.

According to a linear motor of the third aspect of the present invention, in relation to a pair of adjacent magnetic pole members from among the plurality of magnetic pole members, one former-wound coil is fitted around the extremity portion of one of the pair of magnetic pole members, and the other former-wound coil is fitted around a base portion of the other magnetic pole member. Hence, the space which exists between the magnetic pole members and is to be used for fitting the coils to the magnetic pole members can be utilized effectively.

According to a linear motor of the fourth and fifth aspects of the present invention, a plurality of coils constitute a coil of "n" phase. From among the coils of "n" phase, a coil of one phase corresponds to three magnetic poles. Hence, the coil of "n" phase can be readily assembled by alternately repeating two types of coils of one phase, thereby improving the ease of assembly to a much greater extent.

What is claimed is:

1. A linear motor comprising:
    a magnetic flux generation element for generating magnetic flux;
    a magnetic pole member extending toward the magnetic flux generation element;
    an insulation material for coating the magnetic pole member; and
    a coil wound around the insulation material,
    wherein the magnetic pole member has an extremity opposing the magnetic flux generation element, and a part of the magnetic pole member coated with the insulation material, except for the extremity, is thinned in its profile by an amount corresponding to the thickness of the insulation material coating around the magnetic pole member.

2. The linear motor according to claim 1, wherein the coil is a former-wound coil which has been formed into the shape of a coil beforehand wherein the coil has been wound at high density.

3. The linear motor according to claim 1, further comprising:
    a falling prevention member for preventing falling of the coil,
    wherein the falling prevention member is latched at the extremity of the magnetic pole member.

4. The linear motor according to claim 2, further comprising:
    a falling prevention member for preventing falling of the former-wound coil,
    wherein the falling prevention member is latched at the extremity of the magnetic pole member.

5. The linear motor according to claim 1, wherein the magnetic pole member is tapered toward an extremity thereof opposing the magnetic flux generation element, and an inner peripheral surface of the coil has a shape complementary to the tapered shape of the magnetic pole member.

6. The linear motor according to claim 1, wherein the linear motor comprises a plurality of magnetic pole members, magnetic flux generation elements, and coils, and further wherein one coil is wound around an extremity portion of one of a pair of adjacent magnetic pole members from among the plurality of magnetic pole members, and another coil is wound around a base portion of a remaining magnetic pole member of the pair of adjacent magnetic pole members.

7. The linear motor according to claim 1, wherein an outer peripheral surface of the extremity of the magnetic pole member is flush with an outer peripheral surface of the insulation material.

* * * * *